June 11, 1968        J. H. LEMELSON        3,387,723
REMOTE CARRIER CONTROL APPARATUS FOR A WAREHOUSE SYSTEM
Original Filed Dec. 30, 1964        3 Sheets-Sheet 1
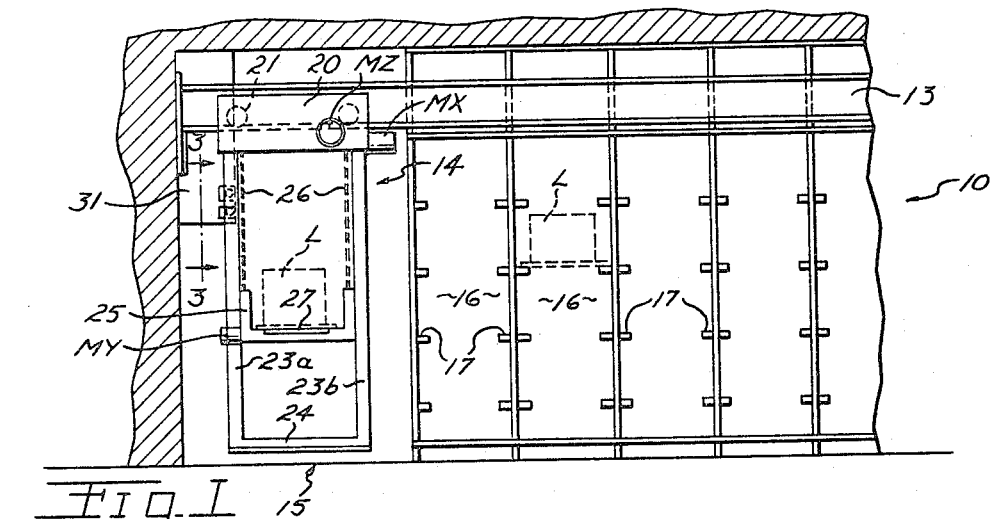
Fig. 1
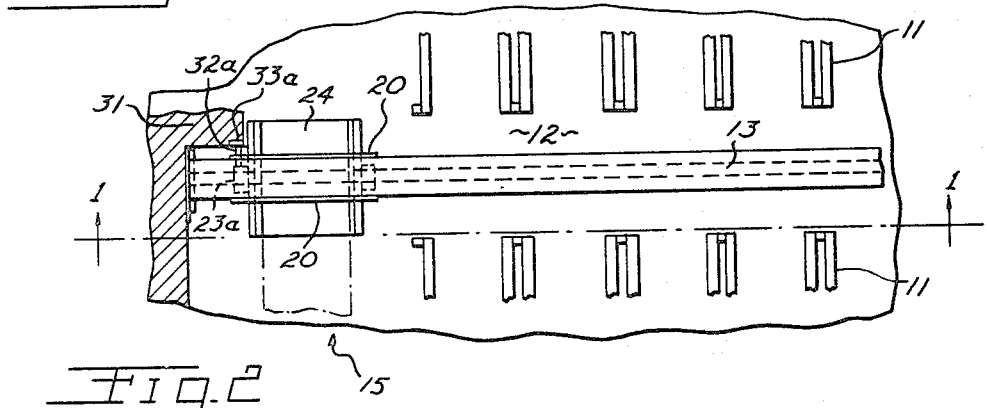
Fig. 2
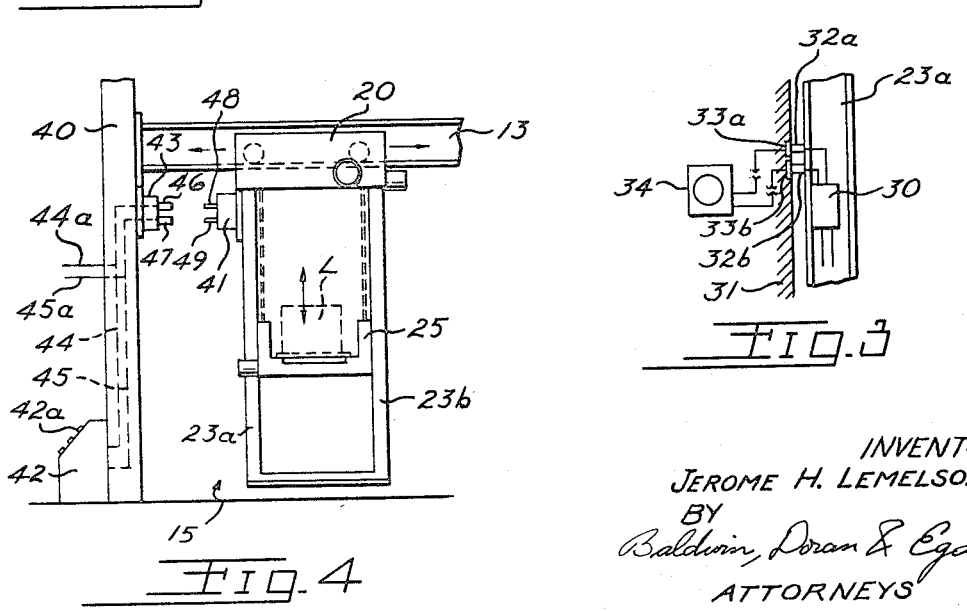
Fig. 3
Fig. 4
INVENTOR
JEROME H. LEMELSON
BY
Baldwin, Doran & Egan
ATTORNEYS June 11, 1968    J. H. LEMELSON    3,387,723
REMOTE CARRIER CONTROL APPARATUS FOR A WAREHOUSE SYSTEM
Original Filed Dec. 30, 1964    3 Sheets-Sheet 3

INVENTOR
JEROME H. LEMELSON
BY
Baldwin, Doran & Egan
ATTORNEYS

3,387,723
REMOTE CARRIER CONTROL APPARATUS FOR A WAREHOUSE SYSTEM

Jerome H. Lemelson, Metuchen, N.J., assignor to The Triax Company, Cleveland, Ohio, a corporation of Ohio Application Dec. 30, 1964, Ser. No. 422,356, now Patent No. 3,285,437, dated Nov. 15, 1966, which is a continuation-in-part of application Ser. No. 152,702, Oct. 17, 1961. Divided and this application Feb. 23, 1966, Ser. No. 529,558

4 Claims. (Cl. 214—16.4)

This application is a division of my copending application Ser. No. 422,356, filed Dec. 30, 1964, for Console Coupling, which, in turn was a continuation-in-part of my copending application Ser. No. 152,702, filed Oct. 17, 1961, for Automatic Production Systems, said application being a division of the application Ser. No. 449,874, filed July 28, 1954 for Automatic Warehousing System, now abandoned.

This invention relates to automatic warehousing systems of the general type disclosed in my United States patents, Automated Storage, No. 3,049,247, issued Aug. 14, 1962, and Automatic Warehousing System, No. 3,119,501, issued Jan. 28, 1964. Automatic systems of the type referred to generally comprise a carrier movable along a trackway which said trackway is disposed adjacent to and parallel with the open face of a storage frame defining storage racks or bins. A carriage is mounted to the carrier for vertical movement, said carriage being provided with a work-handling platform or a pair of forks for transferring a load laterally between the carriage and the storage frame at a selected one of the racks or bins. The carrier may be disposed in an aisle between two storage frames with the platform or pair of forks being insertable into either storage frame either by turning of the carriage or by symmetrical movement of the platform in either lateral direction.

The carrier preferably has a home position or input station which may, for example, be located at one end of the aisle. The input station is conveniently located for loading and unloading the carrier and preferably serves as a reference point from which the carrier, carriage, and platform or forks start in a sequence of movements designed to deposit a load in a storage frame, retrieve a load therefrom, transfer loads within the system, or perform any other series of movements needed in the operation of a storage system.

To carry out the above sequence of movement or "commands," the carrier is provided with a means for storing and carrying out the commands, such as the signal storage and readout or programming means fully disclosed in the above-referred-to United States Patent No. 3,049,247. In the type of signal storage system referred to, coded commands are stored on a magnetic storage drum in a receiver carried by the carrier which said coded commands are read out in the sequence received to effect the sequence of movements desired. Because the coded commands are stored on and travel with the carrier, the means for storing the commands, such as a push-button console, need not be connected to the receiver or carrier during the storing and unstoring of loads. The carrier need only be programmed for return to the input station after each sequence of movements to enable an operator at a console or the like to redirect the carrier in a new sequence of movements.

An important object of the present invention is to provide, in an automatic warehousing system as set forth above, a means for controlling the movement of a carrier without the use of wires or conductors in constant contact between the carrier and the command initiating means.

Another object of the present invention is to provide, in an automated warehousing system, means for storing commands in a carrier while the carrier is at the input station, said means being disconnected from said carrier during load storing and retrieving movements.

Another object is to provide a system of the type described wherein control commands may be transmitted from a fixed control station to a carrier utilizing a concentrated and directionally controlled energy wave beam.

Other objects of the invention and a number of its advantages are disclosed in the following description of the invention, reference being made therein to the accompanying drawings.

FIG. 1 of the drawings shows, generally, a side view of a warehousing arrangement comprising a carrier and storage frame.

FIG. 2 is a top plan view of the arrangement as shown in FIG. 1.

FIG. 3 is a semidiagrammatical elevation taken along the line 3—3 of FIG. 1.

FIG. 4 is a fragmentary view similar to FIG. 1 showing a second embodiment of the invention.

Figure 5:
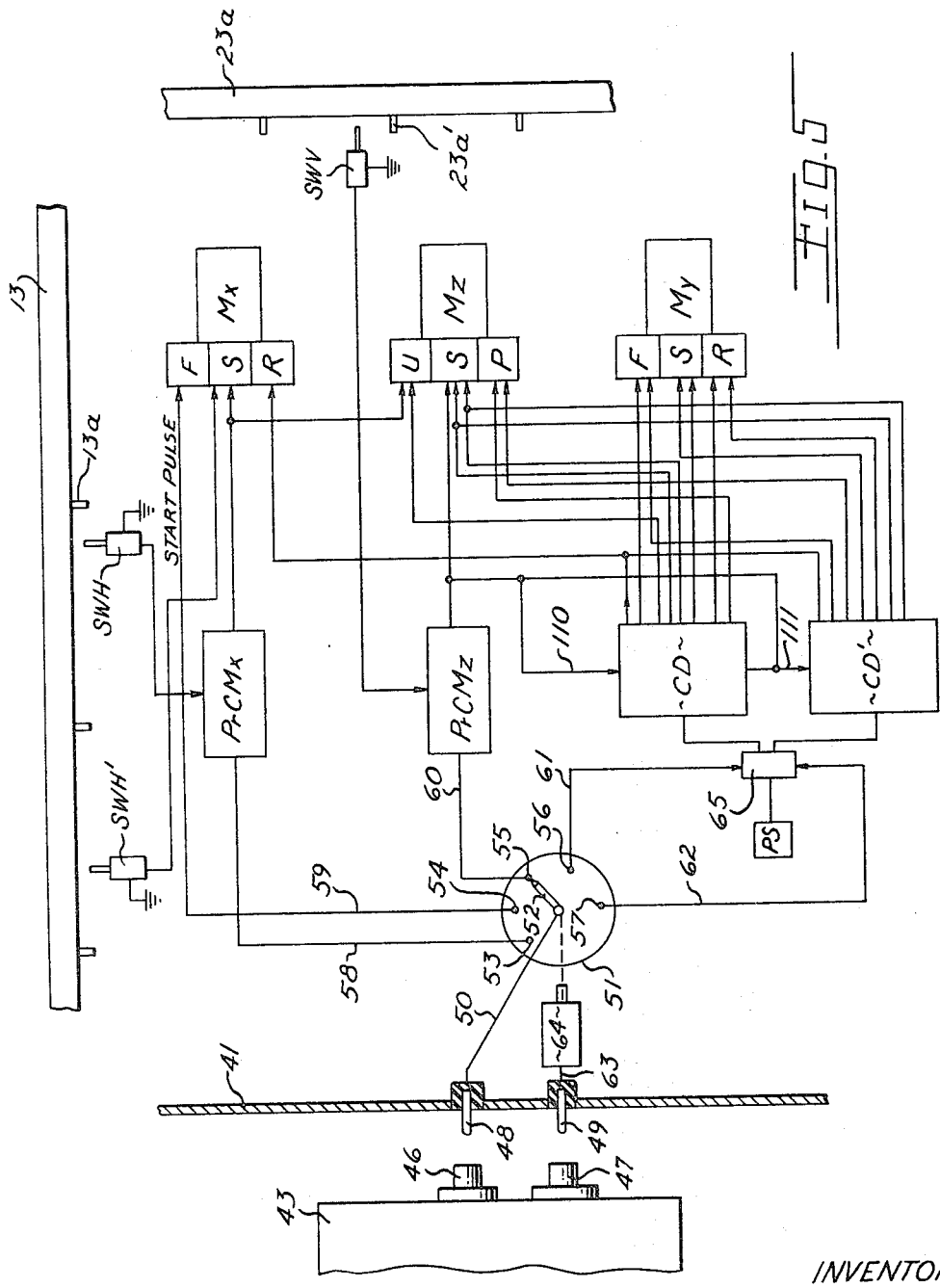
FIG. 5 is a semidiagrammatical, enlarged view of the coupling and control elements of FIG. 4.

Referring now to the drawings, FIGS. 1 and 2 illustrate elements of an automatic warehousing system comprising at least one storage apparatus 10 which includes two parallel and laterally spaced storage frames 11 defining an aisle 12 therebetween and disposed on either side of an overhead conveyor trackway 13. Further details of a similar storage system comprising a stacker crane are illustrated and defined in my said applications and patents. The warehousing system herein illustrated may comprise one or a plurality of said carriers and pairs of storage frames, each storage apparatus being operative to transfer palletized or boxed loads to and from a home position or input station 15 disposed at or near the end of each overhead trackway 13. Loads are stored in any suitable manner at the input station either after being transferred from one of the storage frames or prior to being transferred into one of said storage frames. The storage frames 11 define a multiplicity of storage racks or bins 16, each said bin having spaced ledge members 17 across which the loads are bridged when stored.

The carrier 14 includes an overhead carriage 20 having wheels 21 rotatably mounted thereon for travel along the overhead trackway 13. A first gear motor MX is mounted on the carriage 20 and is operative to drive said carriage along the trackway 13 in both directions under the control of a positional controller to be described.

A carriage frame 22 depends from the carriage 20 and comprises two parallel beam members 23a and 23b joined at their lower ends by a cross member 24. The beam members 23a and 23b are spaced from each other in a direction parallel with the aisle 12 and serve as a vertical track for supporting an elevator carriage 25. Said elevator carriage is vertically movable between the beam members 23a and 23b, drive means for said elevator carriage being provided in the form of a motor MZ supported by the carriage 20 and adapted to lift and lower said elevator carriage through chains 26 or similar flexible hoisting means.

The elevator carriage 25 carries a laterally movable work handling platform 27 which is narrower than the space between the ledge members 17 of the storage frames 11 and which is movable laterally out of the aisle into the said storage frames in either lateral direction for depositing or picking up a load at a selected rack or bin 16. When the platform 27 is supporting a load L, shown in broken line in FIG. 1, said platform is moved laterally slightly above a pair of selected ledge members 17 and is then lowered whereby the load L is bridged across said ledge members. In picking up a load, the platform 27 is initially empty and moves laterally below the level of the ledge member 17 and is subsequently raised to pick up the load from the selected rack or bin. The platform 27 is driven laterally in either direction by a third gear motor MY which is mounted to the elevator carriage 25 and is drivingly connected in any suitable way to said platform.

Referring now particularly to FIG. 3, the beam member 23a carries a housing 30 inside of which are mounted a plurality of control devices for predeterminately controlling the operation of the motors MX, MY, and MZ for positioning the work handling platform with respect to a selected rack or bin 16 and for moving said platform in a predetermined path or paths to effect either the removal of a load from said selected rack or the placement of a load onto said selected rack. The numeral 31 refers to a wall or upright positioned below the level of the trackway 13 adjacent to the beam member 23a when the carrier 14 is at the home position or the input station 15 awaiting command signals. Electrical brushes 32a and 32b, connected to the housing 30 by conductors 35a and 35b, respectively, and carried by said beam members 23a, sweep over the surface of contacts 33a and 33b, respectively, mounted in the wall 31, to make electrical contact therewith while the carrier is parked or at a standstill at the input station. A multiposition dial switch 34, connected to the contacts 33a and 33b by conductors 36a and 36b, respectively, may be located at a remote distance from the wall 31 convenient to an operator's reach for presetting the control devices of the housing 30.

FIG. 4 shows a modification of the storage apparatus of FIG. 1 in which the overhead trackway 13 is carried at one end thereof adjacent to the input station 15 by a vertical support column 40. In the modification of FIG. 4, the beam member 23a carries a housing 41 inside of which are mounted a plurality of control devices predeterminately controlled operation of the motors MX, MY, and MZ for moving the platform 27 is a predetermined path or paths to effect either the removal of a load from a selected rack or the placement of a load onto a selected rack, as described above in connection with the apparatus of FIG. 1. In FIG. 4, the input station 15 includes a control console 42 having means for generating command control signals to be transmitted to the control means mounted in the housing 41. A second housing 43 is mounted to the column 40 opposite to the housing 41, the console 42 being connected to the housing 43 by suitable electrical conductors such as lines 44 and 45. The lines 44 and 45 are connected directly to a pair of coupling members 46 and 47, respectively, which project horizontally in the direction of the carriage 20 and the housing 41 carried thereby. The coupling members 46 and 47 are aligned with coupling members 48 and 49, respectively, which are carried by the housing 41, the arrangement being such that when the carrier 14 moves into the input station 15, the coupling members 48 and 49 respectively engage the coupling members 46 and 47. Thus it will be seen that with the carrier at the start position or input station, electrical connection is made between the console 47 and the control devices carried by the housing 41.

Upon effecting such communicative coupling between the control console 42 and the controllers mounted on the carrier, the operator may transmit signals to the carrier by selectively activating contact means or push-button switches, such as those indicated at 42a in FIG. 4, dial switches such as that shown at 34 in FIG. 3, or any other suitable operative member situated at a control panel. Electrical impulses comprising pulsed command messages generated on the lines 44 and 45 effect the controllers mounted within the housing 41 which said controllers are operative thereafter to control the automatic movement and prepositioning of the carrier 14 and platform 27.

The lines 44 and 45 may also have connected thereto other lines, such as those indicated at 44a and 45a, respectively, which extend to one or more coupling terminal assemblies located elsewhere in a multiple unit conveying system to effect communicative coupling of the console 42 with one or more other storage apparatuses (not illustrated).

FIG. 5 schematically illustrates control components situated within the housing 41 in their operative relationship with the means for effecting coupling between the console 42 and the carrier 14. The coupling members 46-49 may comprise simple electrical brush and brush contact surface means with the coupling members being mounted in and insulated from the walls of the housings 41 and 43. The coupling member 48 is electrically connected to a command input circuit or line 50 which is, in turn, connected to the input of a distributing means in the form of a rotary stepping switch 51 having an arm or wiper 52 and a plurality of output terminals 53, 54, 55, 56 and 57. The output terminals 53, 54, 55, 56 and 57 are connected to lines 58, 59, 60, 61 and 62, respectively, which said lines are, in turn connected to a predetermining controller PrCMX, motor MX, controller PrCMZ, one side of a bi-stable switch 65, and the other side of said bi-stable switch. The predetermining controllers PrCMX and PrCMZ may comprise pulse presettable predetermining counters which respectively receive presetting signals passed through switch 51 and are operative to receive feedback signals generated with incremental movement of the carriage 20 and elevator carriage 25 which carriage and elevator are positionally controlled thereby. Upon encountering, each counter generates a control pulse on its output which is utilized to effect control of the storage apparatus 10 as will be hereinafter described.

The motors MX, MY and MZ are shown having respective forward, reverse, and stop controls which are activated by pulse signals transmitted to each from the predetermining controllers. Motor MX has forward and reverse drive controls F and R and stop control S. Motor MZ has controls U and P, which when pulsed, respectively operate the motor to drive the elevator carriage 25 up and down on its vertical trackway, and a stop control S. Motor MY has forward and reverse controls F and R, which when pulsed respectively cause the motor to advance and retract the platform 27, and stop control S. A predetermining controller CD is now provided, said controller CD being a multicircuit, self-resetting cycle timer having outputs operatively connected to the described controls for motors MX, MY and MZ for effecting, when activated, movement of the platform 27 after it has been aligned with a selected bin 16. A predetermining controller CD' is also provided which comprises a multicircuit, self-resetting cycle timer having outputs connected to the described motor controls to control movement of the platform 27 in a manner to dispose a load carried thereby into a selected bin.

A first switch SWH, mounted on the carriage 20, is operative to scan projecting pins, cut-outs, or dogs 13a disposed along the overhead track 13. The switch SWH provides feedback signals, when actuated by the dogs 13a, which are used to uncount the predetermining controller PrCMX for indicating horizontal movement of the carriage 20. A second switch SWV, mounted on the elevator carriage 25, is operative to scan dogs 23a' provided along one of the beam members 23a and provides feedback signals which are fed to uncount the predetermining counter controller PrCMZ for indicating the vertical position of the elevator carriage 25.

Energizing inputs 110 and 111 connected to the multicircuit timers CD and CD' are connected to the output of the predetermining controller PrCMZ, and the determination of which one of these two controllers is to become activated and effect the further control of the movement of the platform 27 results from the previous activation of a bi-stable switch 65. The bi-stable switch 65 operates to connect or disconnect a power supply PS to either the controller CD or the controller CD' so that, when either line 110 or 111 is pulsed, the selected controller will operate to control movement of the platform in the act of picking up a load from the storage bin or depositing a load thereat.

The switching input lines 61 and 62 of the switch 65 are connected to respective terminals 56 and 57 of the rotary switch 51, and the command signals or code transmitted through said rotary switch is of such nature as to connect the power supply PS to the start control of either the controller CD or the controller CD'. Therefore, only one controller CD or CD' will operate when the predetermining controller PrCMZ uncounts. Both predetermining controllers CD and CD' are operative to geenrate a signal, after the platform 27 has been retracted and clears the racking, for energizing the reverse control R of the motor MX to return the carriage 20 to a home or start position. Another switch SWH', mounted on the carriage 20, is operative to become activated when the carriage has returned to the home or start position and is connected to the stop control S of motor MX for stopping the horizontal movement of the apparatus.

Pulses generated on the line 45 are carried through the coupling member 47 to the coupling member 49 and then through a line 63 to a solenoid 64. Said solenoid is operative to stop the arm or wiper 52 of the rotary stepping switch 51 whereby to gate commands carried by the input circuit 50 to selected of the output terminals 53–57. Thus the predetermining controllers may be selectively preset by pulse trains multiplexed through the rotary stepping switch 51 for effecting the storing or unstoring cycle.

Figure 6:
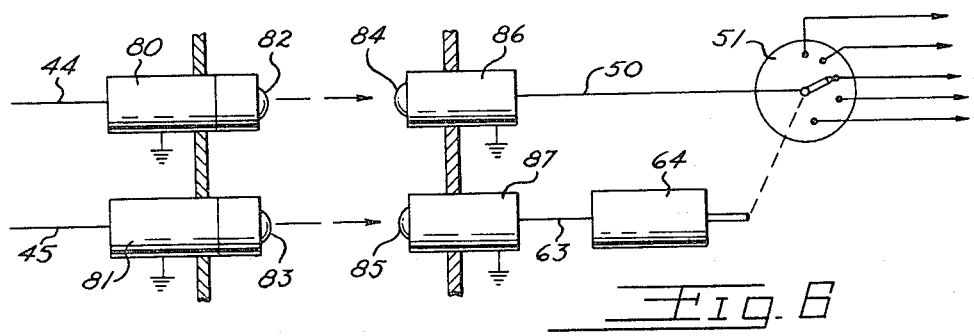
FIG. 6 is a view showing yet another form of the coupling.

FIG. 6 illustrates another means for effecting communicative coupling between the stationary console 42 and the movable carrier 14. Supported by the housing 43 mounted on column 40 are a pair of housings 80 and 81 containing light sources and optical means 82 and 83, respectively, which are operative when the light sources are energized for projecting beams of light. The projection axes of the light beams are preferably parallel with each other and aligned with photoelectric detection means such as photoelectric cells 84 and 85 mounted in respective housings 86 and 87 supported by the housing 41.

The photoelectric detection means in the housings 86 and 87 are respectively operative to generate signals on the lines 50 and 63 which extend respectively to the rotary stepping switch 51 and the solenoid 64. In other words, each time the light source 82 in the housing 80 is energized or pulsed, the beam generated thereby is operative to energize the photoelectric cell 84 in the housing 86 which, in turn, generates a pulse or signal on the line 50 to be gated to an output of the rotary switch 51. Each time the photoelectric cell 85 in housing 87 is energized by the light source 83, the output thereof is amplified and utilized to energize the solenoid 64, or to gate sufficient electrical power to said solenoid to cause its energization, to effect stepping of the switch 51 to the next switching position.

The input lines to the light source in housings 80 and 81 are preferably sequentially energized by switching means which are activated when the push-button switches 42a of the console are manually actuated. Other means of delivering coded messages to the coupling means by intermittent energization of the lines 44 and 45 may be used such as punched cards, a computer input, or by means of reading a card or indicia mounted on conveyor transported pallets or tote boxes as fully disclosed in my above mentioned Patent No. 3,049,247.

A feature of the photoelectric cell means for effecting communicative coupling between the stationary output of the control console 42 and the movable carrier 14 is that the carrier need not be located, as illustrated, immediately adjacent to the column 40. If the light sources 82 and 83 are adapted to project respective light beams parallel to he overhead trackway 13, their beams may be directed at and received by the photoelectric cells 84 and 85 of the carrier at various distances away from said light sources. If intense light sources are utilized, it is possible to effect communicative coupling with the carrier at any location along the overhead trackway 13 provided that said track does not extend beyond the range where the intensity of the light received by the photoelectric cells is sufficient to energize the cells to effect the described output signal generation and control.

Each light source 82 and 83 may comprise any suitable wave emitting means such as an optical maser or so-called laser operative to generate a pulse of intense light projectable therefrom as a beam each time its input or control is energized by a pulse received from the respective control circuit of the pulse generating means or computer mounted in the console 42. Devices 82 and 83 may also represent microwave generating and transmitting means, each one operative to transmit pulses of microwave energy directed at respective wave sensitive receivers located in the housings 86 and 87. Said housings include means for converting the received energy pulses to electrical pulse signals which are used to effect the described actions of presetting the predetermining controllers and stepping the rotary stepping switch 51.

By utilizing pulsed waves or beams of radiant energy, such as light energy or microwave energy, which is receivable by input means in the controllers for the carrier when the carrier is located at any position along the overhead track 13, a most efficient mode of carrier control is effected as it is not necessary to return said carrier to the home position after discharging a load at a selected rack in order to program the carrier to effect the next transfer action. A system in which communicative control may be maintained along the entire length of the overhead track 13 results in minimizing the amount of travel required by the crane to effect controlled transfer movement.

Figure 7:
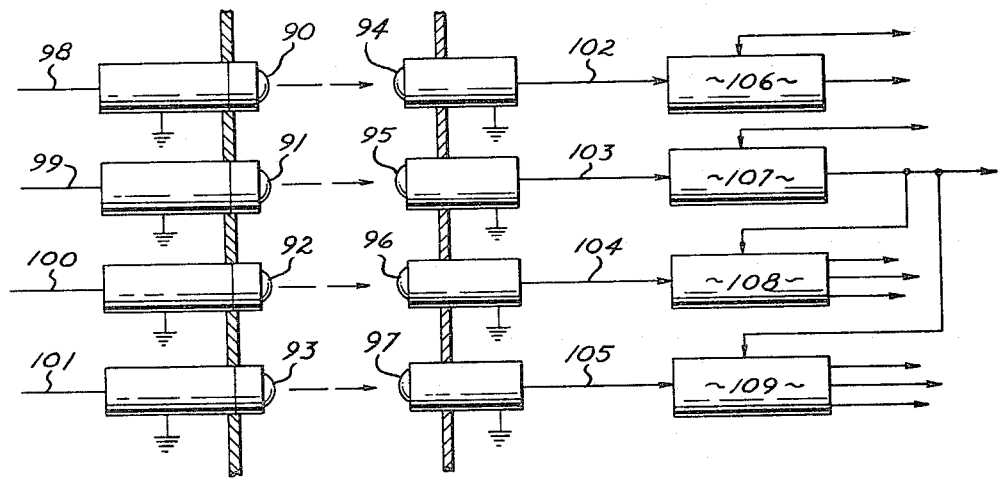
FIG. 7 is a view similar to FIG. 6 showing a further form of the coupling.

In FIG. 7, there is shown communicative coupling means between the console and the carrier controllers in which the rotary stepping switch 51 hereinabove described is eliminated. A plurality of coupling devices are mounted adjacent to each other on the column 40 at the input station. These devices may comprise solenoids, switches, brushes, light sources or the like, as hereinabove described, and are each operative to effect communicative coupling with a respective responsive device carried by the carrier 14. As herein disclosed, light sources 90, 91, 92 and 93 are fixedly carried at the input station 15 and direct light beams to photoelectric cells 94, 95, 96 and 97, respectively, carried by the carrier 14. The light sources 90, 91, 92 and 93 are energized through lines 98, 99, 100 and 101 connected to the console 42, and the output from the photoelectric cells 94, 95, 96 and 97 is directed through lines 102, 103, 104 and 105, respectively. The output lines 102–105 are connected to a plurality of controllers 106, 107, 108 and 109 of the type hereinabove discussed for initiating and carrying out the various necessary movements of the carrier 14, the elevator carriage 25, and the platform 27.

It will be readily understood that the light sources 90–93 can be energized in any order, in groups, or simultaneously to preset or activate their respective controllers and to effect a predetermined cycle of operation. Four such light sources and corresponding photoelectric cells are shown, but it will be understood that any desired number may be used. By this last described coupling means, the carrier 14, carriage 25, and platform 27 can be caused to move in a path to effect transfer of a load from the input station to a selected storage rack or to retrieve a load from a selected storage rack and return it to said input station.

For the purpose of simplifying the drawings, power inputs to most switches, relays, motors and controls have been omitted. Where not shown, it is assumed that the correct power supplies are provided on the correct sides of all such devices and controls therefor.

It will be understood that many changes in the details of the invention as herein described and illustrated may be made without, however, departing from the spirit thereof or the scope of the appended claims.

What is claimed is:

1. An automatic warehousing system having a load handling carrier for delivering and picking up loads at a plurality of load storage locations, means defining a home position from which said carrier starts and to which said carrier returns, power means for actuating said carrier, control means mounted on said carrier and connected to said power means and including means for receiving and storing command messages and subsequently determining movements of said carrier through actuation of said power means, command initiating means, a plurality of independent coupling means for coupling said command initiating means and said control means, each said coupling means comprising a first light wave beam transmitting means mounted adjacent to said home position and a light wave beam receiving means mounted to said carrier, each said transmitting means connected to said command initiating means and each said receiving means connected to said control means, each associated transmitting and receiving means being aligned with each other in the direction of carrier movement and wherein each said transmitting means comprises at least one light source and each said receiving means comprises at least one photoelectric cell axially aligned with the respective light source to receive a beam of light therefrom, each said photoelectric cell connected to a separate of said control means and having means for delivering command messages to the respective of said control means, and said transmitting means comprising a plurality of separate contact means for separately energizing the respective light source.

2. An automatic warehousing system as set forth in claim 1; said light source being of such intensity that command messages are transmittable between said transmitting and receiving means when said carriage is positioned a substantial distance away from said home position.

3. An automatic warehousing system having a load handling carrier for delivering and picking up loads at a plurality of load storage locations arranged in a rack having bays spaced horizontally along an aisle at different levels in each bay, means for moving said carrier horizontally and vertically to a selected storage location and into and out of the rack to deposit and to pick up loads, guide means for said carrier, electric power means for actuating said carrier, control means mounted on said carrier and connected to said power means for determining movements of said carrier to a selected storage location through actuation of said power means, energy wave command transmitting means mounted remote from said carrier and energy wave command receiving means on said carrier, said transmitting means comprising a plurality of light wave beam transmitting members and said receiving means comprising a like number of light wave beam receiving members, each of said receiving members being adapted to be actuated by a respective one of said transmitting members, some of said receiving members connected to different parts of said control means and some of said transmitting means comprising a plurality of separate controllers respectively for separately activating said transmitting members.

4. An automatic warehousing system having a load handling carrier for delivering and picking up loads at a plurality of load storage locations, means defining a home position from which said carrier starts and to which said carrier returns, power means for actuating said carrier, control means mounted on said carrier and connected to said power means and including means for receiving and storing command messages and subsequently determining movements of said carrier through the actuation of said power means, command initiating means, a plurality of independent coupling means for coupling said command initiating means and said control means, each said coupling means comprising a first coupling member mounted adjacent to said home position and a second coupling member mounted to said carrier, said first coupling member comprising a light source and said second coupling member comprising a photoelectric cell, each said first coupling member connected to said command initiating means and each said second coupling member connected to said control means, and each associated first and second coupling members being aligned with each other in the direction of carrier movement and wherein said coupling means comprises at least two separate relay means for transmitting command messages from said command initiating means to said control means, and said control means including distributing means actuatable for directing commands to separate of said control means, means for actuating said distributing means, one of said relay means actuating a circuit through said distributing means and the other of said relay means actuating a circuit to said means for actuating said distributing means.

References Cited
UNITED STATES PATENTS

| | | | |
|---|---|---|---|
| 2,529,804 | 11/1950 | Harnischfeger, et al. | 214—16 |
| 2,696,921 | 12/1954 | Desjardin | 214—16.1 |
| 3,049,247 | 8/1962 | Lemelson | 214—16.4 |
| 3,171,362 | 3/1965 | Noye et al. | 214—11 XR |
| 3,289,001 | 11/1966 | Wilcox | 250—199 |

GERALD M. FORLENZA, *Primary Examiner.*

R. B. JOHNSON, *Assistant Examiner.*